US010171440B2

United States Patent
Yoo

(10) Patent No.: US 10,171,440 B2
(45) Date of Patent: Jan. 1, 2019

(54) METHOD AND APPARATUS FOR MANAGING ENCRYPTION KEYS FOR CLOUD SERVICE

(71) Applicant: SAMSUNG SDS CO., LTD., Seoul (KR)

(72) Inventor: In Seon Yoo, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 112 days.

(21) Appl. No.: 15/166,556

(22) Filed: May 27, 2016

(65) Prior Publication Data

US 2017/0019385 A1    Jan. 19, 2017

(30) Foreign Application Priority Data

May 27, 2015    (KR) .................. 10-2015-0074302

(51) Int. Cl.
*H04L 29/06* (2006.01)
*H04L 9/08* (2006.01)

(52) U.S. Cl.
CPC ............ *H04L 63/061* (2013.01); *H04L 9/085* (2013.01); *H04L 9/0822* (2013.01); *H04L 63/062* (2013.01); *H04L 63/0876* (2013.01); *H04L 2463/062* (2013.01)

(58) Field of Classification Search
CPC .................................................. H04L 63/061
USPC ....................................................... 713/171
See application file for complete search history.

(56) References Cited

U.S. PATENT DOCUMENTS

| 6,286,098 | B1* | 9/2001 | Wenig ................. H04L 63/0442 |
| | | | 713/151 |
| 6,748,084 | B1* | 6/2004 | Gau ....................... H04L 9/085 |
| | | | 380/277 |
| 7,787,619 | B2 | 8/2010 | Nadooshan et al. |
| 8,259,950 | B2 | 9/2012 | Nadooshan et al. |
| 8,625,802 | B2 | 1/2014 | Parann-Nissany |
| 8,886,931 | B2 | 11/2014 | Matsunaka et al. |
| 9,667,416 | B1* | 5/2017 | Machani ............... H04L 9/0822 |
| 2002/0067832 | A1 | 6/2002 | Jablon |
| 2003/0147535 | A1 | 8/2003 | Nadooshan et al. |
| 2006/0285683 | A1* | 12/2006 | Anatharaman ......... H04L 9/085 |
| | | | 380/30 |

(Continued)

FOREIGN PATENT DOCUMENTS

KR    20030077065 A    10/2003

OTHER PUBLICATIONS

Massey et al., Minimal Codewords and Secret Sharing, In: Proc. Sixth Joint Swedish-Russian Workshop on Inf. Theory, Molle, Sweden, 1993, 246-249.*

*Primary Examiner* — Peter C Shaw
(74) *Attorney, Agent, or Firm* — Sughrue Mion, PLLC

(57) ABSTRACT

Key management methods and systems are provided, one of methods comprises, encrypting a service key used by an instance of a first user of a cloud service by using a master key, generating two or more key pieces for reconstructing the master key, distributing and storing the key pieces in two or more host servers included in a host group for providing the cloud service, receiving a request for the service key from the instance of the first user, receiving the key pieces from the two or more host servers and reconstructing the master key based on the received key pieces, and decrypting the encrypted service key by using the reconstructed master key.

15 Claims, 8 Drawing Sheets

(56) References Cited

U.S. PATENT DOCUMENTS

| | | | |
|---|---|---|---|
| 2010/0046739 A1* | 2/2010 | Schneider | H04L 9/085 380/28 |
| 2010/0217986 A1* | 8/2010 | Schneider | H04L 9/085 713/171 |
| 2012/0121088 A1 | 5/2012 | Hata et al. | |
| 2012/0179911 A1 | 7/2012 | Zheng et al. | |
| 2012/0243687 A1 | 9/2012 | Li et al. | |
| 2012/0328105 A1* | 12/2012 | Mukkara | H04L 9/0897 380/277 |
| 2013/0262421 A1* | 10/2013 | Ferguson | H04L 9/0643 707/698 |
| 2015/0019870 A1 | 1/2015 | Patnala et al. | |
| 2016/0253515 A1* | 9/2016 | Damgard | H04L 9/085 713/165 |
| 2016/0261408 A1* | 9/2016 | Peddada | H04L 9/0861 |

* cited by examiner

METHOD AND APPARATUS FOR MANAGING ENCRYPTION KEYS FOR CLOUD SERVICE

This application claims priority from Korean Patent Application No. 10-2015-0074302 filed on May 27, 2015 in the Korean Intellectual Property Office, the disclosure of which is incorporated herein by reference in its entirety.

BACKGROUND

1. Field

Exemplary embodiments consistent with the present invention relate to a method and an apparatus for managing a service key for encrypting data and primary credentials of a cloud service and a master key for encrypting the service.

2. Description of the Related Art

Numerous data or primary credentials requiring security are encrypted by using an encryption key. However, when the encryption key is stored in a database as a general plain text, there is a risk that the stored encryption key may be leaked by a database administrator (DBA) or an insider. When the encryption key is encrypted by using a hardware security module (HSM), there is a limit in that a company that provides the hardware security module knows the master key for encrypting the encryption key. Further, in the case where the encryption key is encrypted by using a homomorphic algorithm, and the like, and when the master key encrypting the encryption key is lost, there is a problem in that encrypted data cannot be recovered any longer. Accordingly, required is a solution to secure secrecy and availability of the encryption key.

SUMMARY

Aspects of the exemplary embodiment provide a method and an apparatus for a service key capable of encrypting and decrypting data and primary credentials of a cloud service with a separate master key and thereafter, generating key pieces capable of reconstructing the master key only under a specific condition and distributing and storing the generated key pieces in a plurality of servers.

In some embodiments, a key management method, comprises, encrypting a service key used by an instance of a first user of a cloud service by using a master key, generating two or more key pieces for reconstructing the master key, distributing and storing the key pieces in two or more host servers included in a host group for providing the cloud service, receiving a request for the service key from the instance of the first user; receiving the key pieces from the two or more host servers and reconstructing the master key based on the received key pieces, an decrypting the encrypted service key by using the reconstructed master key.

In some embodiments, a key management system, comprises, a key access server encrypting a service key used by an instance of a first user of a cloud service by using a master key and thereafter, generating, and distributing and storing two or more key pieces for reconstructing the master key, and decrypting the encrypted service key by reconstructing the master key based on the distributed and stored key pieces when receiving a request for a service key from the instance of the first user, and host servers receiving and storing the key pieces from the key access server and transmitting the key pieces when receiving a request for the key pieces from the key access server.

In some embodiments, computer program, recorded in a recording medium, wherein the computer program executes the following steps in conjunction with a computer apparatus, the steps comprise, encrypting a service key used by an instance of a first user of a cloud service by using a master key, generating two or more key pieces for reconstructing the master key, distributing and storing the key pieces in two or more host servers included in a host group for providing the cloud service, receiving a request for a service key from the instance of the first user, receiving the key pieces from the two or more host servers and reconstructing the master key based on the received key pieces, and decrypting the encrypted service key by using the reconstructed master key.

The aspects of the exemplary embodiments are not restricted to the one set forth herein. The above and other aspects of the exemplary embodiments will become more apparent to one of ordinary skill in the art to which the exemplary embodiments pertains by referencing the detailed description of the exemplary embodiments given below.

As described above, the exemplary embodiments are advantageous in that key pieces capable of reconstructing a master key only under a specific condition are generated and distributed and stored in a plurality of servers and the master key is not stored even in any server or apparatus to secure secrecy of the master key. Further, although some of the distributed and stored key pieces are lost, the master key can be reconstructed, and as a result, availability of the master key can be secured. Moreover, although the key piece leaks, the master key cannot be reconstructed only with the leaked key piece.

BRIEF DESCRIPTION OF THE DRAWINGS

The above and other aspects and features of the exemplary embodiments will become more apparent by describing in detail exemplary embodiments thereof with reference to the attached drawings, in which.

DETAILED DESCRIPTION OF THE EXEMPLARY EMBODIMENTS

Prior to describing the present specification, some terms used in the present specification will be described.

A cloud service is a service in which a local computing device can store various data in an external server connected to a network and download and use the data from the external server as necessary. In more detail, the local computing device can store data not in an internal storage space but in the external server connected to the network. In addition, when the local computing device requires the data stored in the external server, the local computing device can download and use the data from the external server. In particular, a cloud service according to the exemplary embodiments may be an infrastructure as a service (IaaS) or software as a service capable of providing a virtualized infrastructure environment to the local computing device, but is not limited thereto.

A service key is a key used for an instance executed through the cloud service to encrypt and decrypt data. The service can have different values according to a user (tenant) of the cloud service, the service provided through the cloud service, or the application of the service provided through the cloud service, but is not limited thereto. Further, the service key can have different sizes or types according to a user of the cloud service, the service provided through the cloud service, or the application of the service provided through the cloud service, but is not limited thereto.

A master key is a key used for encrypting and decrypting the service key. The master key can have different values according to a user of the cloud service, the service provided through the cloud service, or a business associated with the cloud service, but is not limited thereto.

Hereinafter, the exemplary embodiments will be described in detail with reference to the accompanying drawings.

Figure 1:
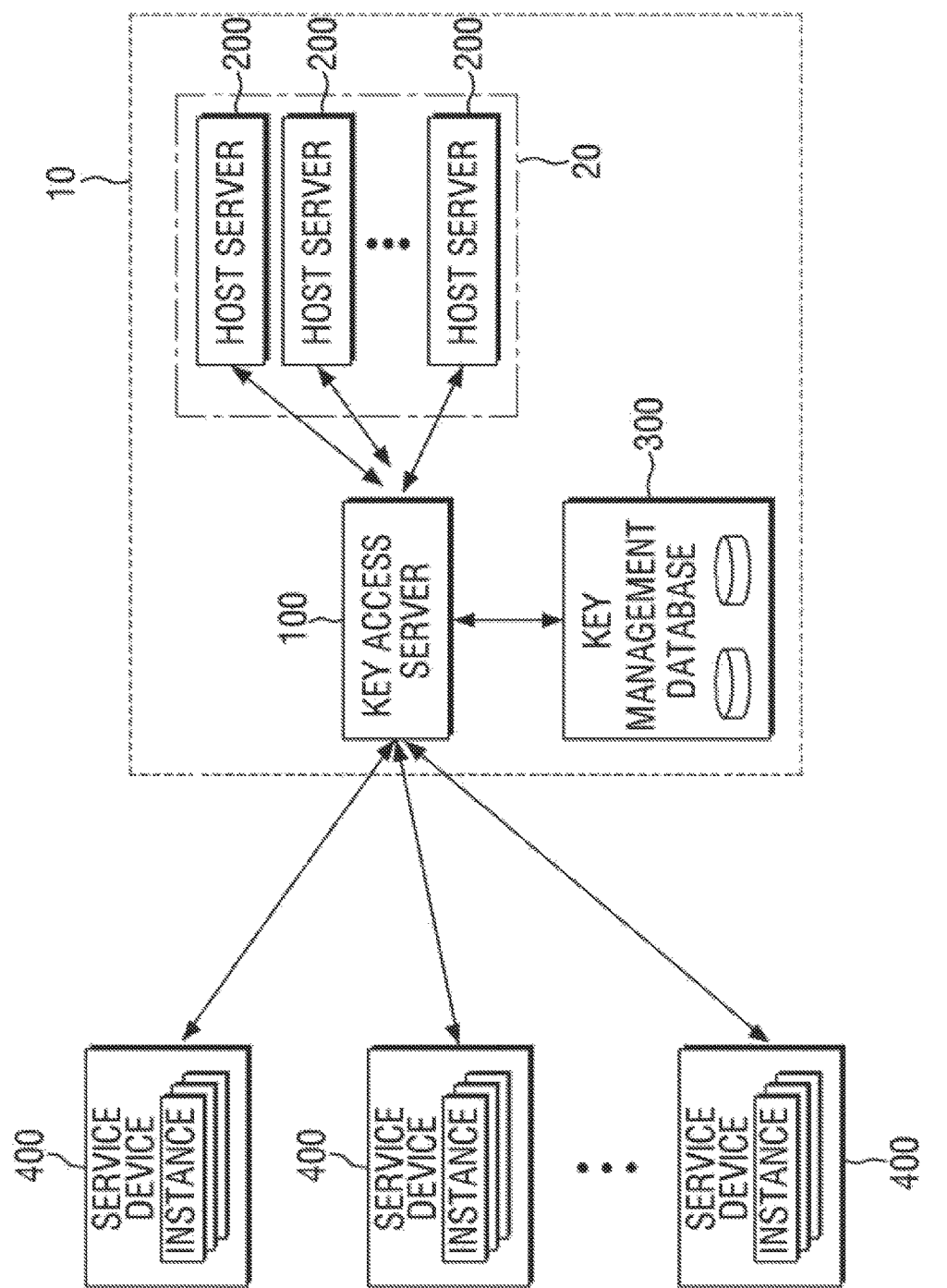
FIGS. 1 to 3 are conceptual diagrams of a cloud service system according to exemplary embodiments.
Figure 2:
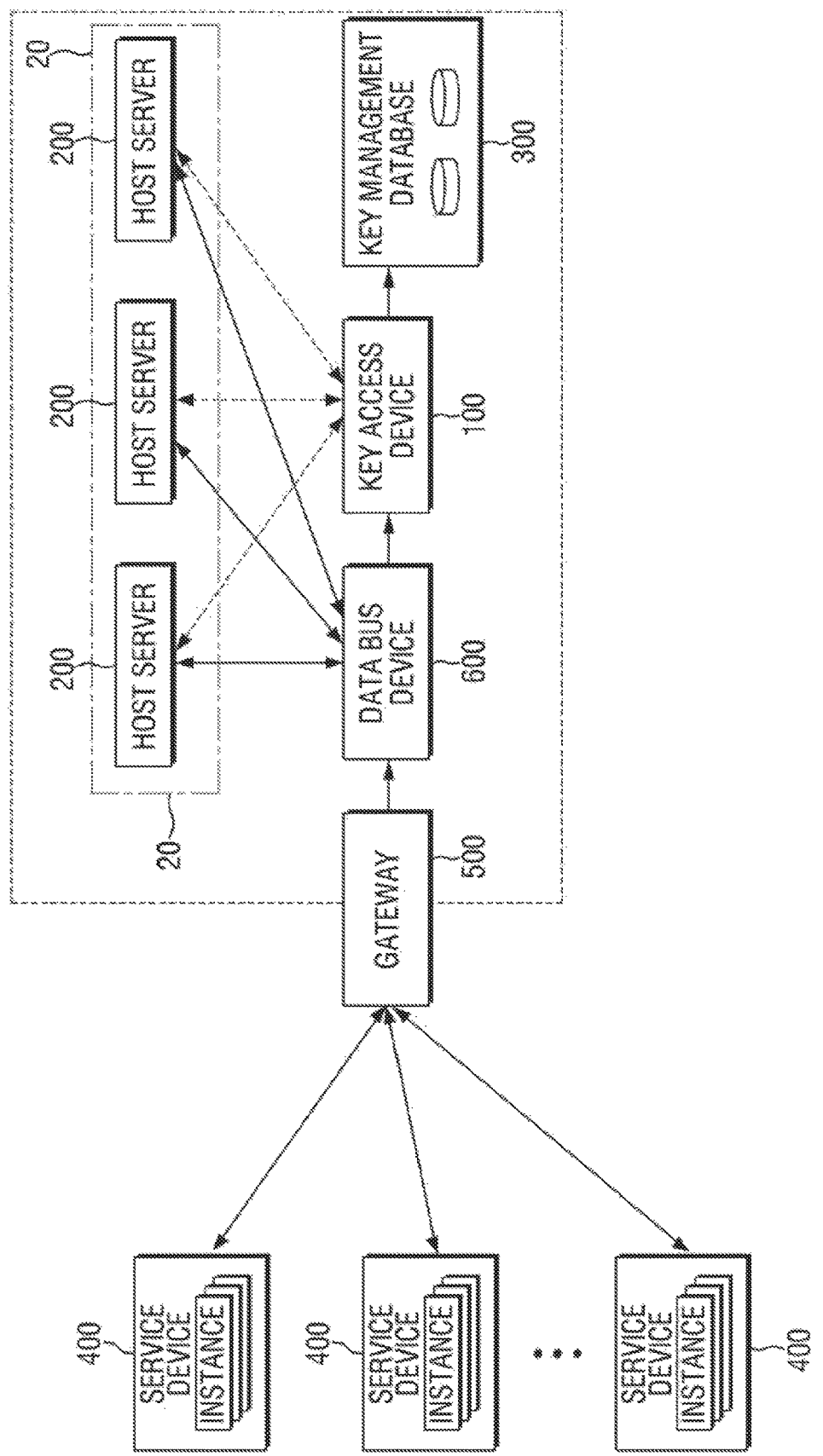
Figure 3:
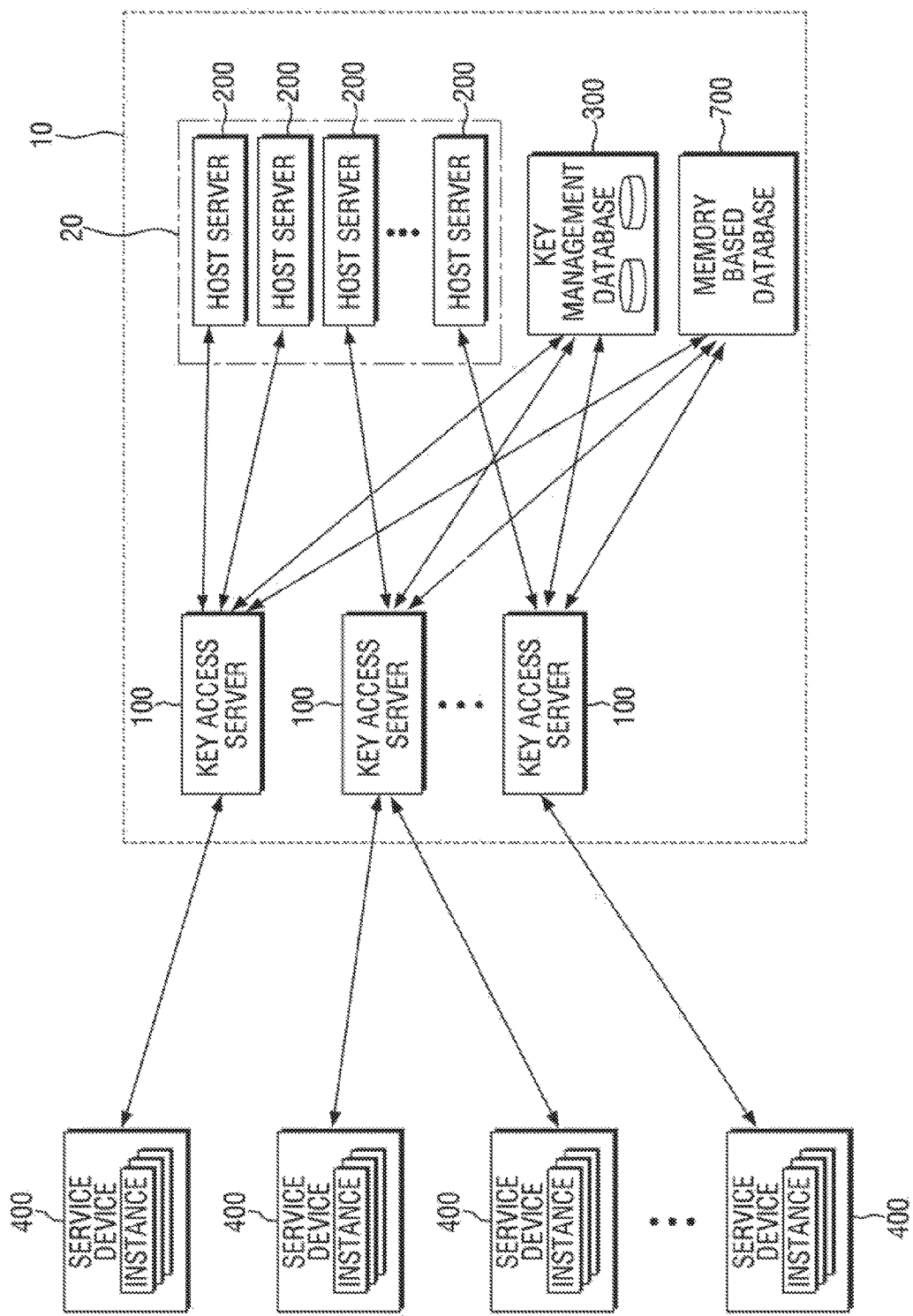

FIGS. 1 to 3 are conceptual diagrams of a cloud service system according to exemplary embodiments. Respective components of the cloud service system disclosed in FIGS. 1 to 3 represent functional elements which are functionally distinguished and one or more predetermined components may be implemented while being integrated with each other in an actual physical environment.

Referring to FIG. 1, the cloud service system according to an exemplary embodiment may be configured to include a key management system 10 and a plurality of service devices 400. In addition, the key management system 10 may be configured to include a key access server 100, a plurality of host servers 200, and a key management database 300. Hereinafter, respective components of the cloud service system according to an exemplary embodiment will be described in detail.

The key access server 100 is a server that may distribute and manage a master key capable of encrypting and decrypting a service key used by an instance of a cloud service. In particular, the key access server 100 according to an exemplary embodiment may encrypt the service key by using the master key and thereafter, generate a plurality of key pieces capable of reconstructing the master key only under a specific condition and distribute and store the generated key pieces in the plurality of host servers 200. Further, the key access server 100 may reconstruct the master key based on the key pieces received from the plurality of host servers 200 and decrypt the service key by using the reconstructed master key. As described above, the key access server 100 will be described later in detail with reference to FIGS. 2 to 9.

Next, the plurality of host servers 200 are servers that may receive and store the key pieces from the key access server 100. In more detail, the plurality of host servers 200 are servers in which a key management agent is installed among homogeneous or heterogeneous servers for providing the cloud service. For example, a user management server, a server coordinator device, a data analysis server, an event management server, or a big data storage server in which the key management agent is installed may be included in the plurality of host servers 200, but the servers are not limited and an exclusive server for key management may be included in the plurality of host servers 200. The plurality of host servers 200 may form a host group 20.

The plurality of host servers 200 included in the host group 20 may receive and store the key pieces from the key access server 100. In addition, the plurality of host servers 200 may extract the store key pieces and transmit the extracted key pieces to the key access server 100 in response to a request of the key access server 100.

One of the plurality of host servers 200 included in the host group 20 may encrypt one key piece by using an encryption key and thereafter, transmit the encrypted key piece to the key access server 100. Herein, the encryption key may be present differently for each host server 200, but is not limited thereto and may designate a temporary key and share the designated temporary key with the key access server 100 in real time.

The plurality of host servers 200 included in the host group 20 may determine whether the key access server 100 is a malicious server by using data for verifying the key pieces opened by the key access server 100.

The plurality of host servers 200 included in the host group 20 may receive their respective key pieces from the key access server 100 and thereafter, calculate hash values of the received key pieces and transmit the calculated hash value to the key access server 100.

In addition, the plurality of host servers 200 included in the host group 20 may generate random seeds for guaranteeing generation of a random and unique master key and transmit the generated random seeds to the key access server 100, according to the request of the key access server 100.

Next, the key management database 300 is a database which may store the service key encrypted by using the master key. In more detail, the key management database 300 may store the encrypted service key received from the key access server 100. Further, the key management database 300 may include and store a master key table and a service key table.

Herein, the master key table may include an identification of the master key, an identification of a user of the cloud service, an identification of the service key, a generation date of the master key, the hash value of the master key, or an identification of the host server 200 in which the key pieces of the master key are distributed and stored, but is not limited thereto.

In addition, the service key table may include an identification of the service key, the identification of the user of the cloud service, a service key use history, and the like, but is not limited thereto.

The key management database 300 may be a component independent from the key access server 100, but is not limited thereto and it will be apparent to those skilled in the art that the key management database 300 may be one component of the key access server 100. Furthermore, the key management database 300 may be a relational database (RDB) in which a predetermined relation is present between the master key table and the service key table, but is not limited thereto.

Next, the service device 400 is a server that provides the cloud service. In more detail, the service device 400 may be virtualized through a hypervisor. Herein, the hypervisor is a platform that allocates a resource of the service device 400 and other resources and provides an interface for resource management and monitoring. In addition, the service device 400 may execute an application for the cloud service and an instance of the application through a virtualized virtual machine.

The instance of the service device 400 may encrypt the data of the cloud service by using the service key. The service device 400 transmits the service key to the key access server 100 to request protection. Further, when the data of the cloud service is required, the service device 400 may receive the service key from the key access server 100 and thereafter, decrypt the data of the cloud service by using the received service key.

In addition, the service device 400 may transmit or receive the data to or from the key access server 100 by using a key management interoperability protocol (KMIP). Further, the service device 400 may transmit or receive the data to or from the key access server 100 by using a secure sockets layer or transport layer security protocol (SSL or TLS protocol).

Referring to FIG. 2, a cloud service system according to another exemplary embodiment may further include a gateway 500 and a data bus device 600. Hereinafter, components additionally included in the cloud service system according to another exemplary embodiment will be described in detail.

The gateway 500 may control an access between the service device 400 and the key management system 10. In more detail, the gateway 500 may limit an access to the server included in the key management system 10 of the service device 400. Further, the gateway 500 may limit an access to the service device 400 of the server included in the key management system 10.

Moreover, the gateway 500 may provide an application programming interface (API) depending on a representational state transfer (REST) architecture to the service device 400. Further, the gateway 500 may transmit to the data bus device 600 an event depending on the data received from the service device 400.

Next, the data bus device 600 may control data transmission between the servers included in the key management system 10. In more detail, the data bus device 600 may transmit to the key access server 100 or the host server 200 the event received from the gateway 500. Further, the data bus device 600 may control the data transmission between the key access server 100 and the host server 200.

However, although the data bus device 600 is included in the key management system 10, the key access server 100 may transmit or receive the key piece to or from the host server 200 directly without using the data bus device 600.

Referring to FIG. 3, in a cloud service system according to yet another exemplary embodiment, there may be a plurality of key access servers 100 or a cluster of a plurality of key access servers 100. Hereinafter, components additionally included in the cloud service system according to yet another exemplary embodiment will be described in detail.

A memory based database 700 may store the master key repeatedly used by the key access server 100 in a memory therein, in order to improve an access speed of the key access sever 100 to the master key. In more detail, the memory based database 700 may store the master key reconstructed by the key access server 100. The memory based database 700 may store the reconstructed master key in the memory (in-memory). The memory based database 700 may receive a request for a master key from the key access server 100. The memory based database 700 may transmit to the key access server 100 the master key stored in the memory in response to the request for the master key.

Hereinafter, a method for distributing and storing the master key and a method for reconstructing the master key of the key access server 100 according to an exemplary embodiment will be described in detail.

Figure 4:
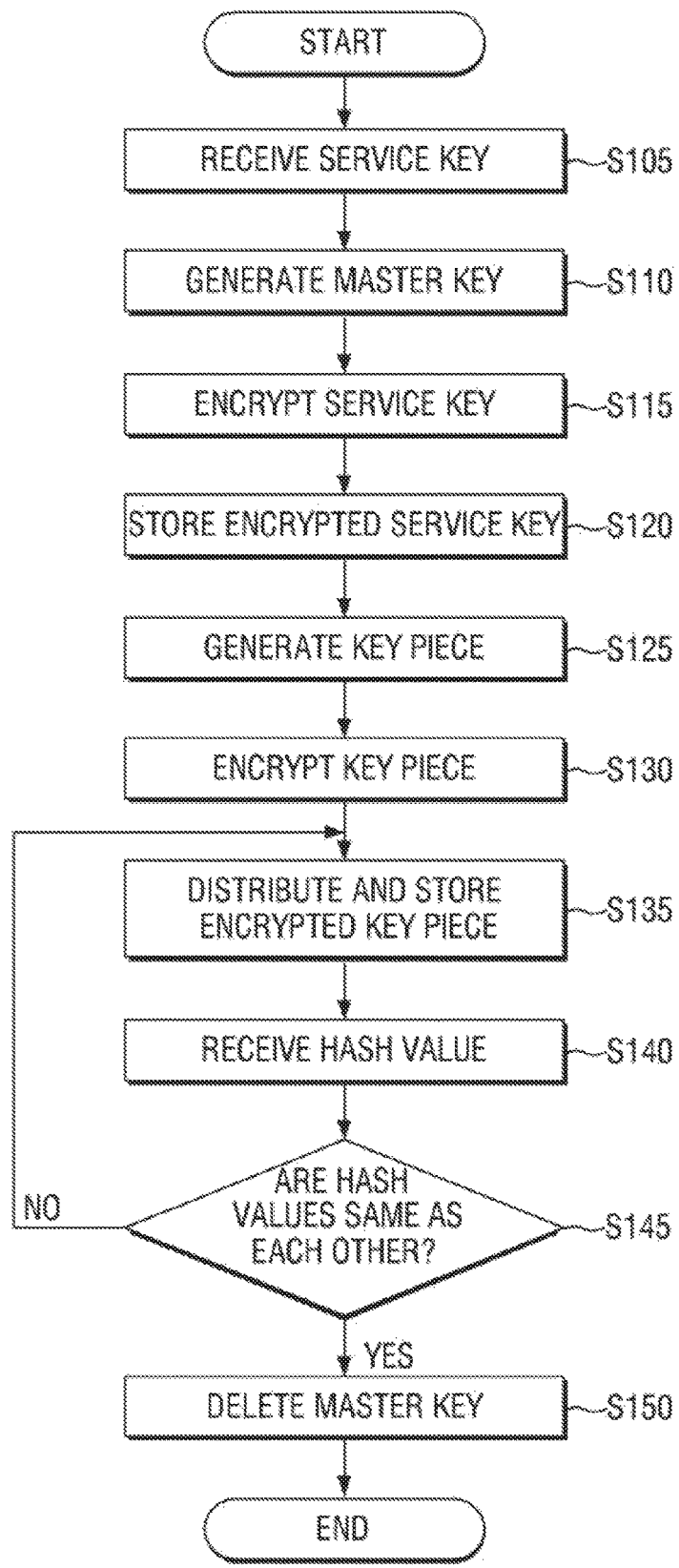
FIG. 4 is a flowchart for describing a method for distributing and storing a master key according to an exemplary embodiment.

FIG. 4 is a flowchart for describing a method for distributing and storing a master key according to an exemplary embodiment.

Referring to FIG. 4, the key access server 100 receives a service key from an instance of the service device 400 (S105). Herein, the service key is a key used for encrypting and decrypting data by the instance of the service user. The service key may have different sizes or types according to a user of the cloud service, the service provided through the cloud service, or the application of the service provided through the cloud service, but is not limited thereto. Further, the key access server 100 may receive the service from the instance of the service device 400 by using the key management interoperability protocol (KMIP), but is not limited thereto.

Furthermore, the key access server 100 may receive the identification of the cloud service user and the identification of the service key from the instance of the service device 400 before receiving the service key from the instance of the service device 400 and authenticate the instance by using the received identification of the service user and identification of the service key, but is not limited thereto.

Next, the key access server 100 generates the master key for encrypting the received service key (S110). In detail, the key access server 100 requests a random seed from the host server 200. The key access server 100 generates the master key according to a predetermined random generation mechanism based on the random seed received from the host server 200. Accordingly, the master key generated by the key access server 100 may have a random and a unique value according to the user (tenant) of the cloud service, the service provided through the cloud service, or a business associated with the cloud service. Further, the key access server 100 receives the random seed from the host servers 200 that are stably connected at the time when a new master key is required and generates the master key based on the received random seed to reduce a possibility of predicting a value of the generated master key.

Next, the key access server 100 encrypts the service key by using the generated master key (S115). In addition, the key access server 100 stores the encrypted service key in the key management database 300 (S120).

Next, the key access server 100 generates two or more key pieces for reconstructing the master key (S125). In detail, the key access server 100 may generate the key piece capable of reconstructing the master key only when the number of key pieces is equal to or more than a threshold number. Herein, the method for generating the key piece of the key access server 100 will be described in more detail.

It is assumed that a threshold number of key pieces required for the key access server 100 to reconstruct the master key is $k$. For example, the threshold number $k$ may be 3, but is not limited thereto. The key access server 100 generates a random number of $k-1$. It is assumed that respective random numbers generated by the key access server 100 are $\alpha k_{-1}, \alpha k_{-2}, \ldots, \alpha_1$. In addition, the key access server 100 sets $\alpha_0$ as the master key.

The key access server 100 generates a $k^{th}$ degree polynomial expression, $f(x)$ in which coefficients of first to $k-1$-th degree terms are $\alpha k_{-1}, \alpha k_{-2}, \ldots, \alpha_1$ and a coefficient of a 0-th degree term is $\alpha_0$. The polynomial expression, $f(x)$ generated by the key access server 100 is shown in Equation 1 given below.

$$f(x) = a_{k-1}x^{k-1} + a_{k-2}x^{k-2} + \ldots + a_1 x + a_0 \qquad \text{[Equation 1]}$$

Where, $f(0)$ becomes the master key.

The key access server 100 generates $n$ key pieces based on a function value of the polynomial expression $f(x)$ for identifications of $n$ host servers 200 which distribute and store the key pieces. Where, $1 < k \leq n$.

Therefore, the key management system 10 according to an exemplary embodiment may generate $n$ key pieces which are completely different from the master key.

Further, the key access server 100 may generate a remainder (mod) acquired by the function value of the polynomial expression, $f(x)$ by a maximum size which the master key may have as the key piece. In this case, all sizes of the generated key pieces may be the same as each other.

Therefore, the key management system 10 according to an exemplary embodiment generates the key pieces so that the sizes of all key pieces are the same as each other, and as a result, even if some of the key pieces leak to the outside or the inside, it is difficult to predict the master key based on the size of the leaked key piece.

Next, the key access server 100 encrypts $n$ generated key pieces by using encryption keys different for each host server 200 (S130). Herein, the encryption keys may be predetermined to be different for each host server 200. The encryption key may be set in the key access server 100 at the time when the key management agent is to be installed in the host server 200, but is not limited thereto and the temporary key designated in real time may be received from the host server 200.

Accordingly, the key management system 10 according to an exemplary embodiment encrypts the key pieces by using the encryption keys different for each host server 200, and as a result, even though an encrypted key piece of a first host server 200 is leaked to a second host server 200, the second host server 200 which may not know the encryption key of the first host server 200, may not decrypt the encrypted key piece.

Next, the key access server 100 distributes and stores $n$ encrypted key pieces in $n$ host servers 200 (S135). In more detail, the key access server 100 may transmit the key piece to the host server 200 by using a key sharing protocol. Herein, the key sharing protocol is a unique protocol defined so that data transmission or reception between the host servers 200 included in the host group 20 is not permitted. Further, the key sharing protocol is a protocol defined so that the data transmission or reception is permitted only when one side of the data transmission or reception is the key access server 100.

Further, the key access server 100 may select a host server 200 not associated with the cloud service of the user, which is associated with the master key which becomes a basis of the key piece in selecting the host server 200 which will store the key piece among the host servers 200 included in the host group 20. That is, the key access server 100 may distribute and store a master key for a first user in the host server 200 not associated with the cloud service provided to the first user.

Therefore, the key management system 10 according to an exemplary embodiment distributes and stores the master key for the first user in the host server 200 not associated with the cloud service provided to the first user, and as a result, a person which has a close relation with the first user may not collect the key piece from the host server 200 associated with the cloud service of the first user.

Next, the key access server 100 receives hash values from $n$ host servers 200 in which $n$ encrypted key pieces are distributed and distributed, respectively (S140). In addition, the key access server 100 compares the received hash values and the hash values of the generated key pieces to determine whether the hash values are the same as each other (S145). As a result of the determination, when the hash values received from $n$ host servers 200, respectively, and different hash values among respective key pieces generated based on the master key are present, the key access server 100 may transmit the encrypted key piece to the corresponding host server 200 again.

As the result of the determination, when the hash values received from $n$ host servers 200, respectively and the respective hash values generated based on the master key are the same as each other, the key access server 100 stores the hash values of the respective key pieces in the key management database 300. In addition, when the master key is stored in a memory or storage, the key access server 100 deletes the stored master key (S150).

Accordingly, the key management system 10 according to an exemplary embodiment encrypts the service key used in the cloud service with a separate master key and thereafter, generates and distributes and stores the key piece capable of reconstructing the master key only when the key pieces are equal to or more than the threshold number, and does not store the master key even in any server or device to secure secrecy of the master key.

Figure 5:
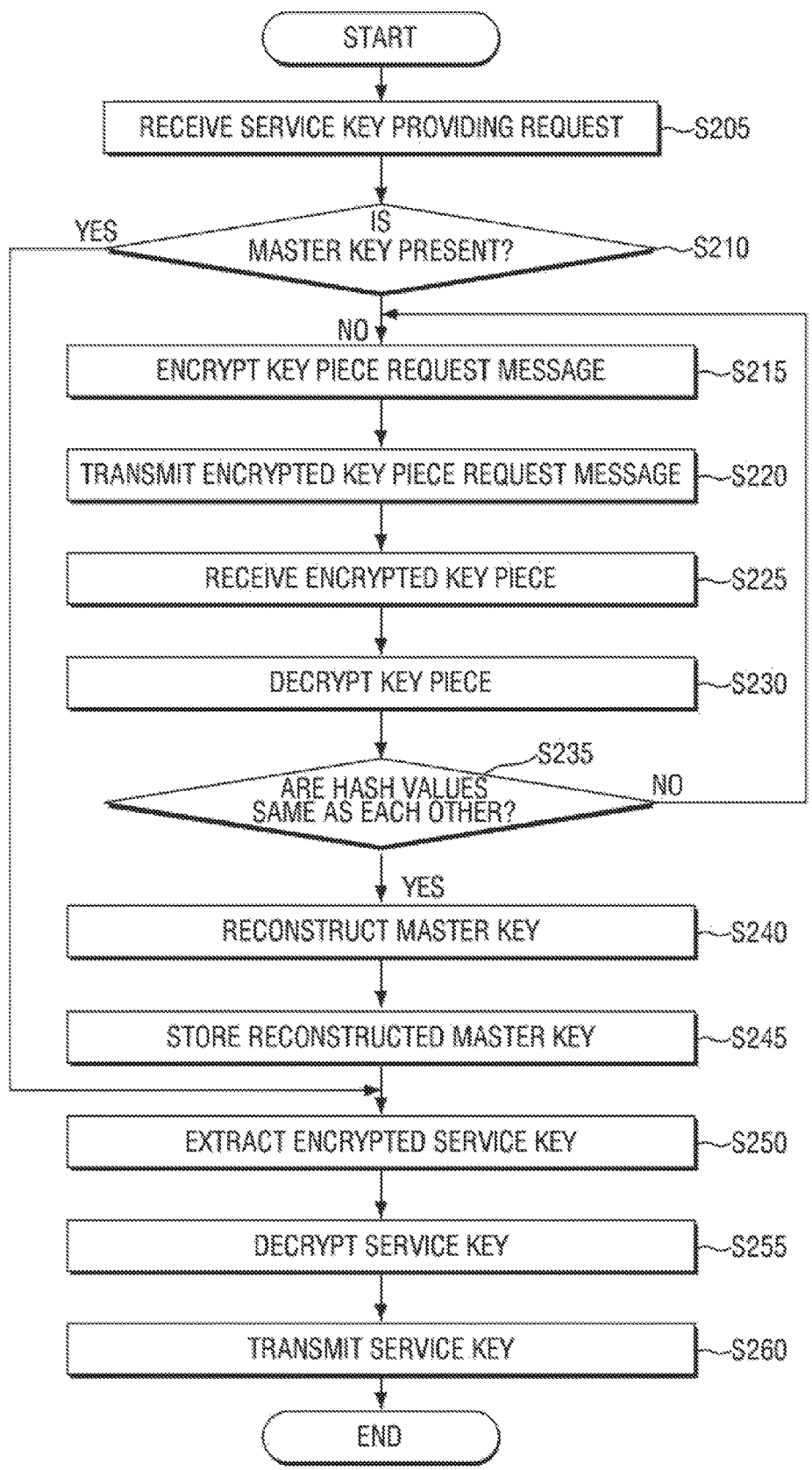
FIG. 5 is a flowchart for describing a method for reconstructing a master key according to an exemplary embodiment.

FIG. 5 is a flowchart for describing a method for reconstructing a master key according to an exemplary embodiment.

Referring to FIG. 5, the key access server 100 receives a request for the service key from an instance of the service device 400 (S205). The key access server 100 may receive the request for the service key from the instance of the service device 400 by using the secure socket layer or transmit layer security protocol (SSL or TLS protocol), but is not limited thereto.

Furthermore, the key access server 100 may receive the identification of the cloud service user and the identification of the service key from the instance of the service device 400 before receiving the request for the service key from the instance of the service device 400 and authenticate the instance by using the received identification of the service user and identification of the service key, but is not limited thereto.

Next, the key access server 100 determines whether the master key associated with the instance requesting the service key is present in the memory of the key access server 100 or the memory based database 700 (S210).

As a result of the determination, when the corresponding master key is not present in the memory of the access server 100 and the memory based database 700, host servers 200 are identified, which are equal to or more than $k$ which is the threshold number of the key pieces required for reconstructing the master key among $n$ host servers 200 distributing and storing the key pieces. In addition, the key access server 100 encrypts key piece request messages by using the encryption keys for the respective identified host servers 200, respectively (S215).

Next, the key access server 100 transmits the encrypted key piece request messages to the respective identified host servers 200 (S220). Herein, the key access server 100 may not transmit the encrypted key piece request messages to all of $n$ host servers 200 distributing and storing the key pieces, but transmit the encrypted key piece request messages only to the host servers 200 which are equal to or more than $k$ which is the threshold number of key pieces required for reconstructing the master key among $n$ host servers 200 distributing and storing the key pieces.

Further, the key access server 100 may transmit the encrypted key piece request message by using the key sharing protocol. Herein, the key sharing protocol is a unique protocol defined so that the data transmission or reception between the host servers 200 included in the host group 20 is not permitted. Further, the key sharing protocol is a protocol defined so that the data transmission or reception is permitted only when one side of the data transmission or reception is the key access server 100.

Next, the key access server 100 receives the encrypted key pieces from the respective host servers 200 that transmit the key piece request messages (S225). The key access server 100 may transmit the encrypted key piece by using the key sharing protocol. In addition, the key access server 100 decrypts the respective encrypted key pieces by using the host servers 200 that transmit the key piece request messages (S230).

Next, the key access server 100 compares the hash values of the respective decrypted key pieces and the respective hash values stored in the key management database 300 to determine whether the hash values are the same as each other (S235). As a result of the determination, when different hash values are present among the hash values of the respective decrypted key pieces and the respective hash value stored in the key management database, the key access server 100 may transmit the encrypted key transmission request message to the corresponding host server 200 again.

As the determination result, when all of the hash values of the respective decrypted key pieces and the respective hash values stored in the key management database 300 are the same as each other, the key access server 100 reconstructs the master key based on the key piece (S240). In detail, the key access server 100 may reconstruct the master key by using Lagrange interpolation. Hereinafter, the method for reconstructing the master key of the key access server 100 will be described in detail.

It is assumed that the threshold number for key pieces required for reconstructing the master key is $k$ and a key piece for $i$ which is the host server 200 is $y_i$. The key access server 100 may calculate the master key $f(0)$ by using Equation 2 given below.

$$f(0) = \sum_{j=1}^{k} y_{i_j} \prod_{1 \le l \le k, l \ne j} \frac{x_{i_l}}{x_{i_l} - x_{i_j}}$$ [Equation 2]

Therefore, the key management system 10 according to an exemplary embodiment may not reconstruct the master key when key pieces which is less than the threshold number $k$ are present among $n$ key pieces distributed and stored in $n$ host servers 200 and may reconstruct the master key only when the key pieces equal to or more than the threshold number $k$ are present.

Next, the key access server 100 may store the reconstructed master key in the memory based database 700 (S245). It is apparent to those skilled in the art that when the memory based database 700 is not included in the key management system 10 according to an exemplary embodiment, the method may be performed while this step is omitted.

In addition, the key access server 100 extracts an encrypted service key associated with a request of the instance from the key management database 300 (S250). The key access server 100 decrypts the encrypted service key by using the master key (S255). In addition, the key access server 100 stores the decrypted service key to the instance of the service device 400 (S260).

Therefore, although some of the distributed and stored key pieces are lost, the key management system 10 may reconstruct the master key, and as a result, the availability of the master key may be secured. Further, even though the key pieces equal to or more than the threshold number required for generating the master key leak, the key pieces are encrypted with different encryption keys, the master key may not be reconstructed only with the leaked key pieces.

Hereinafter, a method for distributing and storing the master key and a method for reconstructing the master key according to another exemplary embodiment will be described in detail.

Figure 6:
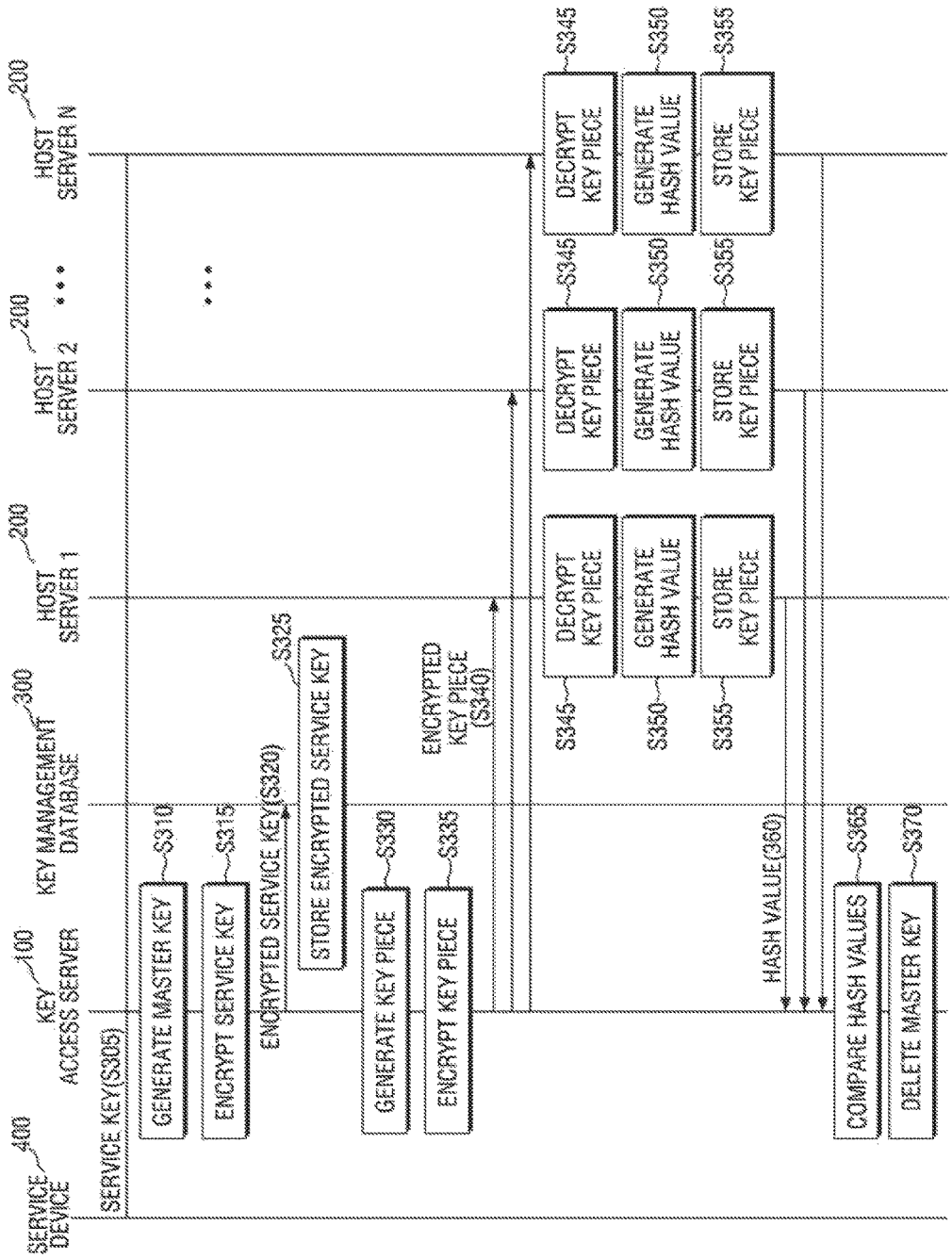
FIG. 6 is a signal flowchart for describing a method for distributing and storing a master key according to another exemplary embodiment.

FIG. 6 is a signal flowchart for describing a method for distributing and storing a master key according to another exemplary embodiment.

Referring to FIG. 6, the instance of the service device 400 encrypts data of the cloud service with the service key and thereafter, transmits the service key to the key access server 100 (S305). In detail, the instance of the service device 400 may transmit the service key to the key access server 100 by using the key management interoperability protocol (KMIP), but is not limited thereto.

The key access server 100 generates the master key for encrypting the received service key (S310). The key access server 100 encrypts the received service key by using the generated master key (S315). In addition, the key access server 100 transmits the encrypted service key to the key management database 300 (S320).

The key management database 300 stores the encrypted service key in response to reception of the encrypted service key (S325).

The key access server 100 generates two or more key pieces for reconstructing the master key (S330). In detail, the key access server 100 may generate the key piece capable of reconstructing the master key only when the number of key pieces is equal to or more than a threshold number. Since more detailed description of the method for generating the key piece of the key access server 100 is the same as the description referring to FIG. 4, the method for generating the key piece of the key access server 100 is not described.

The key access server 100 encrypts the respective key pieces by using encryption keys that are different for each host server 200 (S335). Herein, the encryption key may be set in the key access server 100 at the time when the key management agent is to be installed in the host server 200, but is not limited thereto and the temporary key designated in real time may be received from the host server 200.

The key access server 100 transmits the respective encrypted key pieces to the host servers 200 (S340). The key access server 100 may transmit the key pieces to the host server 200 by using the key sharing protocol.

The host servers 200 decrypt the received key pieces by using the respective encryption keys (S345). The host servers 200 generate hash values of the decrypted key pieces (S350). The host servers 200 store the decrypted key pieces (S355). In addition, the host servers 200 transmit the generated hash values to the key access server 100.

The key access server 100 compares the hash values received from the host servers 200 and the hash values of the key pieces generated based on the master key to determine whether the hash values are the same as each other (S365). As a result of the determination, when different hash values among the hash values received from the host servers 200 and the hash values generated based on the master key are present, the key access server 100 may retransmit the encrypted key pieces to the corresponding host server 200 again.

As the determination result, when all of the hash values received from the host servers 200 and the hash values generated based on the master key are the same as each other, the key access server 100 deletes the master key stored in the memory or storage (S370).

Figure 7:
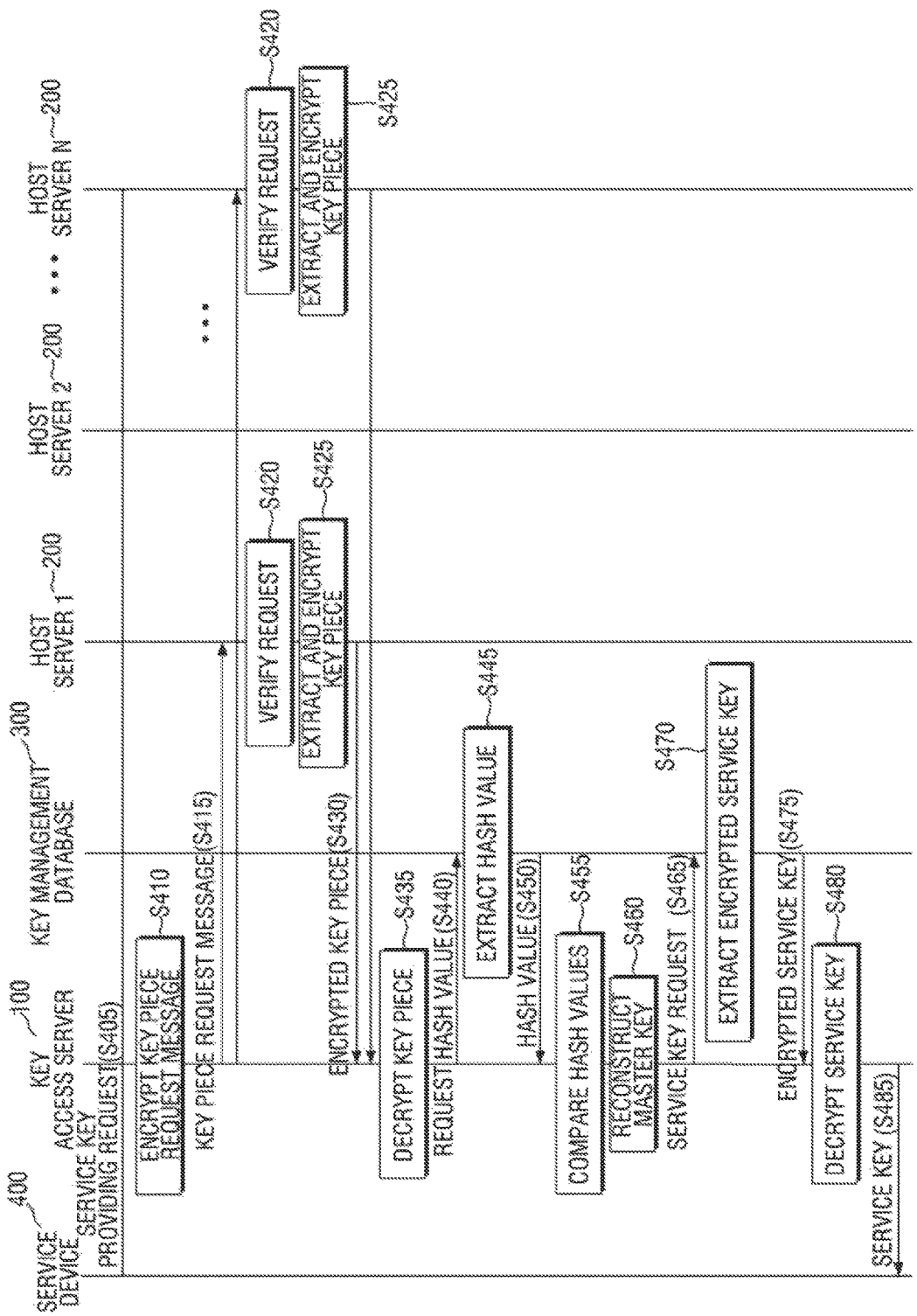
FIG. 7 is a signal flowchart for describing a method for reconstructing a master key according to another exemplary embodiment.

FIG. 7 is a signal flowchart for describing a method for reconstructing a master key according to another exemplary embodiment. Hereinafter, it is assumed that the master key is not present in the memory of the key access server 100 and the memory based database 700.

Referring to FIG. 7, the instance of the service device 400 transmits the request for the service key to the key access server 100 in order to decrypt data of the cloud service (S405). In detail, the instance of the service device 400 may transmit the request for the service key to the key access server 100 by using the secure socket layer or transmit layer security protocol (SSL or TLS protocol), but is not limited thereto.

The key access server 100 identifies the host servers 200 distributing and storing the key pieces for the master key for decrypting the service key in response to reception of the providing request of the service key. The key access server 100 encrypts key piece request messages by using the encryption keys for the respective identified host servers 200, respectively (S410). In addition, the key access server 100 transmits the encrypted key piece request messages to the respective identified host servers 200 (S415).

The host servers 200 decrypt the encrypted key piece request message with the respective encryption keys. In addition, the host servers 200 verify whether the key access server 100 is a malicious server (S420). Hereinafter, a verification method using an ideal number of host servers 200, which is proposed by Feldman will be described in more detail.

It is assumed that the key access server 100 opens encrypted values $E(\alpha), E(\alpha_1), \ldots, E(\alpha_{t-1})$ of a coefficient t of a function to generate the key piece with respect to the host servers 200. When Equation 3 given below is not established, the host server 200, i may determine that the key access server 100 is the malicious server.

$$E(f(i)) = E(\alpha^0) + (E(\alpha^1) \times E(i^1)) + \ldots + (E(\alpha^{t-1}) \times E(i^{t-1}))$$ [Equation 3]

However, the host servers 200 may verify the key access server 100 by using a verification method proposed by Pederson, not only by the verification method proposed by Feldman.

When the key access server 100 is not the malicious server, the host servers 200 extract the respective stored key pieces and encrypt the extracted key pieces with the respective encryption keys. In addition, the host servers 200 transmit the encrypted key pieces to the key access server 100 (S430).

The key access server 100 decrypts the decrypted key pieces by using the encryption keys for the respective host servers 200 transmitting the key pieces (S435). In addition, the key access server 100 transmits a to request for a hash value of the key piece, to the key management database 300 (S440).

The key management database 300 extracts the hash value of the key piece in response to the request for the hash value of the key piece (S445). In addition, the key management database 300 transmits the extracted hash value to the key access server 100.

The key access server 100 compares the hash values of the decrypted key pieces and the hash values received from the key management database 300 to determine whether both hash values are the same as each other (S455). As a result of the determination, when different hash values are present among the hash values of the decrypted key pieces and the hash values received from the key management database 300, the key access server 100 may transmit the encrypted key piece request message to the corresponding host server 200 again.

As the determination result, when all of the hash values of the decrypted key pieces and the hash values received from the key management database 300 are the same as each other, the key access server 100 reconstructs the master key based on the key pieces (S460). In detail, the key access server 100 may reconstruct the master key by using the Lagrange interpolation. Since more detailed description of the method for reconstructing the master key of the key access server 100 is the same as the description referring to FIG. 5, the method for reconstructing the master key of the key access server 100 is not described.

The key access server 100 transmits the encrypted service key providing request to the key management database 300 (S465).

The key management database 300 extracts the encrypted service key in response to the encrypted service key providing request (S470). In addition, the key management database 300 transmits the extracted encrypted service key to the key access server 100 (S475).

The key access server 100 decrypts the encrypted service key by using the reconstructed master key (S480). In addition, the key access server 100 stores the decrypted service key to the instance of the service device 400 (S485).

Up to now, the methods according to an exemplary embodiment described with reference to FIGS. 4 to 7 may be performed by executing a computer program implemented with a computer readable code. The computer program is transmitted from a first computing device to a second computing device through a network such as the Internet, or the like to be installed in the second computing device, and as a result, the computer program may be used in the second computing device. Herein, the first computing device and the second computing device may include all of a fixed computing device such as a desktop, a server, or a workstation, a mobile computing device such as a smart phone, a tablet, a phablet, or a laptop, and a wearable computing device such as a smart watch, smart glasses, or a smart band Hereinafter, referring to FIGS. 8 and 9, a logic configuration of the key access server 100 according to an exemplary embodiment will be described in detail.

Figure 8:
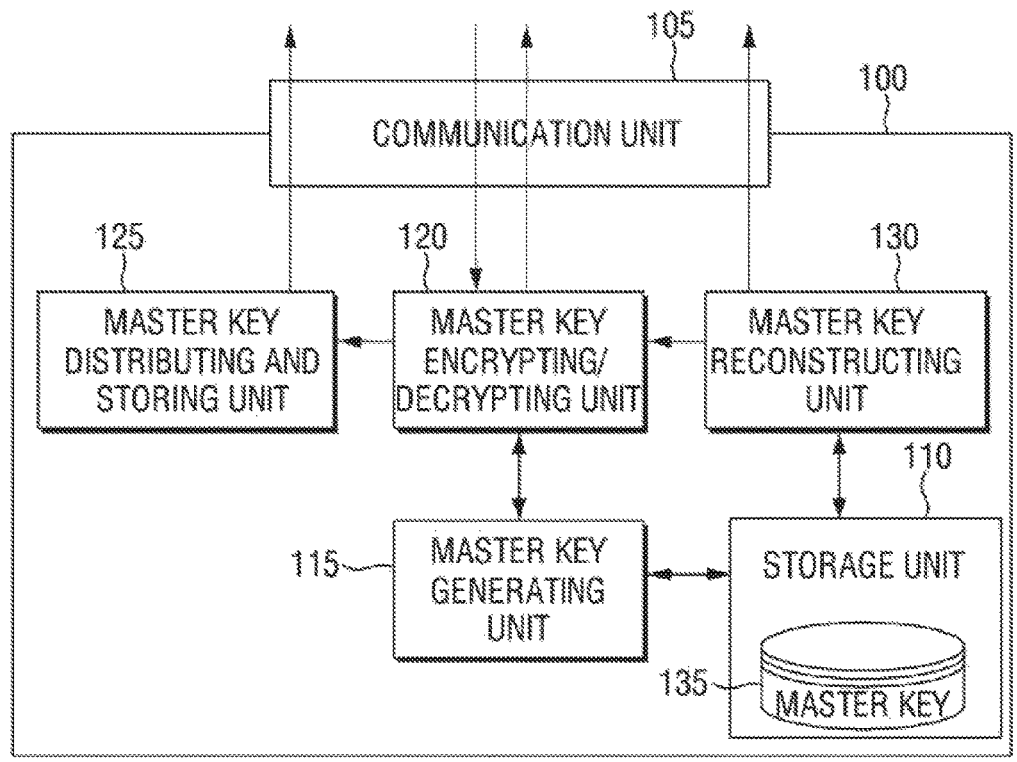
FIG. 8 is a block diagram of a key access server according to an exemplary embodiment.

FIG. 8 is a block diagram of a key access server 100 according to an exemplary embodiment. Referring to FIG. 8, the key access server 100 may include a communication unit 105, a storage unit 110, a master key generating unit 115, a service key encrypting and decrypting unit 120, a master key distributing and storing unit 125, and a master key reconstructing unit 130.

When respective components are described, a communication unit 105 may transmit or receive data to or from the host server 200 by using the key sharing protocol. The communication unit 105 prepares a query for requesting data providing to transmit or receive the data to or from the key management database 300. Further, the communication unit 105 may transmit or receive the data to or from the service device 400 by using the key management interoperability protocol (KMIP) or the secure socket layer or transmit layer security protocol (SSL or TLS protocol).

The storage unit 110 may store data required for operating the key access server 100. In particular, when the service key is repeatedly requested from the instance of the service device 400 and the key access server 100 thus repeatedly uses the master key for a specific service, the storage unit 110 may further include and store a master key 135 in a memory based storage in order to improve an access speed to the master key.

The master key generating unit 115 may generate the master key for encrypting the service key. In detail, the master key generating unit 115 transmits a request for the random seed to the host server 200 through the communication unit 105. The master key generating unit 115 receives the random seed from the host server 200 through the communication unit 105. The master key generating unit 115 generates the master key according to a predetermined random generation mechanism based on the random seed. Accordingly, the master key generated by the master key generating unit 115 may have a random and unique value according to the user (tenant) of the cloud service, the service provided through the cloud service, or the business associated with the cloud service. Further, the master key generating unit 115 receives the random seed from the host servers 200 stably connected at the time when a new master key is required and generates the master key based on the received random seed to reduce a possibility of predicting a value of the generated master key.

When the service key encrypting and decrypting unit 120 receives the service key through the communication unit 105, the service key encrypting and decrypting unit 120 may encrypt the service key based on the master key generated through the master key generating unit 115. Further, when the master key is reconstructed through the master key reconstructing unit 130, the service key encrypting and decrypting unit 120 may decrypt the encrypted service key.

The master key distributing and storing unit 125 may generate two or more key pieces for reconstructing the master key and transmit the generated key pieces through the communication unit 105. In detail, the master key distributing and storing unit 125 may generate the key piece capable of reconstructing the master key only when the number of key pieces is equal to or more than a threshold number. Since more detailed description of the method for generating the key piece of the master key distributing and storing unit 125 is the same as the description referring to FIG. 4, the method for generating the key piece of the master key distributing and storing unit 125 is not described.

In addition, the master key distributing and storing unit 125 encrypts the respective key pieces by using encryption keys different for each host server 200. The master key distributing and storing unit 125 may transmit the respective encrypted key pieces to the host servers 200 through the communication unit 105. The master key distributing and storing unit 125 may receive hash values through the communication unit 105. In addition, the master key distributing and storing unit 125 compares the received hash values and the hash values of the key pieces to determine whether both hash values are the same as each other.

The master key reconstructing unit 130 may reconstruct the master key by using two or more key pieces. In detail, the master key reconstructing unit 130 may receive the encrypted key pieces through the communication unit 105. The master key reconstructing unit 130 may decrypt the encrypted key pieces by using the encryption keys for the respective host servers 200 transmitting the key pieces. The master key reconstructing unit 130 may receive hash values from the key management database 300 through the communication unit 105. The master key reconstructing unit 130 compares the hash values of the decrypted key piece and the hash values received from the key management database 300 to determine whether both hash values are the same as each other.

In addition, the master key reconstructing unit 130 may reconstruct the master key by using the decrypted key pieces. In detail, the master key reconstructing unit 130 may reconstruct the master key by using the Lagrange interpolation. Since more detailed description of the method for reconstructing the master key of the master key reconstructing unit 130 is the same as the description referring to FIG. 5, the method for reconstructing the master key of the master key reconstructing unit 130 is not described.

Up to now, respective components of FIG. 8 may be implemented in software or hardware such as a field-programmable gate array (FPGA) or an application-specific integrated circuit (ASIC). However, the components are not limited to software or hardware and may be configured in a storage medium to be addressed or configured to be execute one or more processors. Functions provided in the components may be implemented by more detailed components or implemented as one component that performs a specific function by combining a plurality of components.

Figure 9:
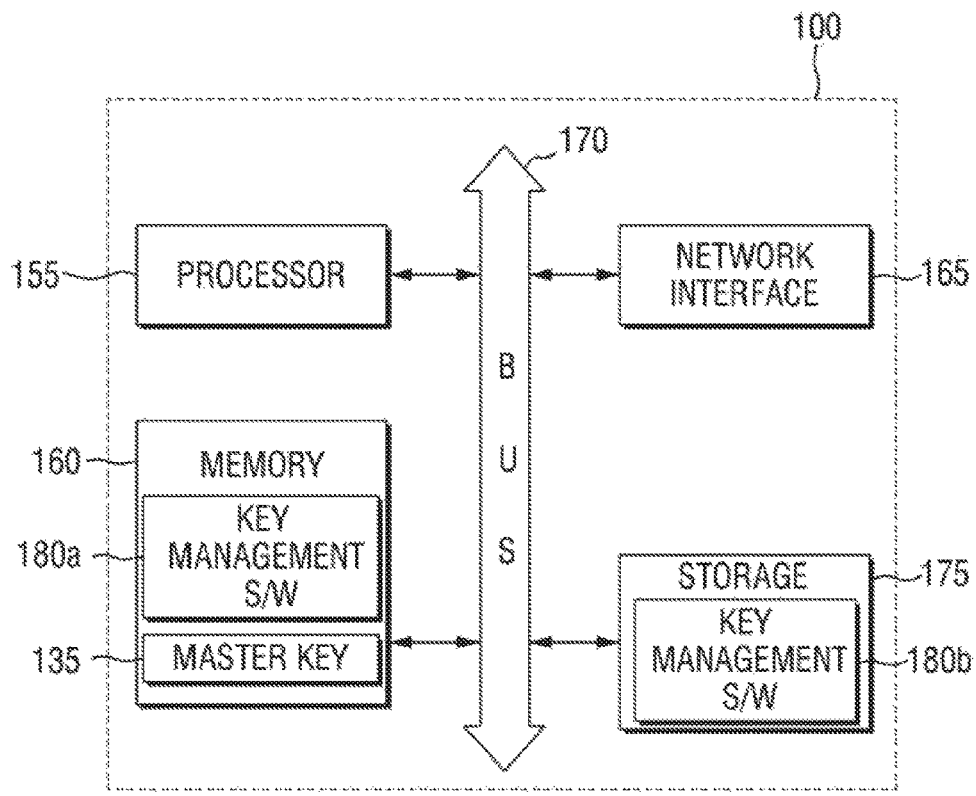
FIG. 9 is a hardware configuration diagram of a key access server according to an exemplary embodiment.

FIG. 9 is a hardware configuration diagram of a key access server 100 according to an exemplary embodiment. Referring to FIG. 9, the key access server 100 may be configured to include a processor 155, a memory 160, a network interface 165, a data bus 170, and a storage 175.

Computer program data 180a, e.g., key management software, in which a key management method is implemented may reside in the memory 160. Further, when the key access server 100 repeatedly uses the master key, the memory 160 may further include and store the master key 135.

The network interface 165 may transmit or receive data to or from the host server 200 and the key management database 300. Further, the network interface 165 may transmit or receive data to or from the service device 400.

The data bus 170 is connected with the processor 155, the memory 160, the network interface 165, and the storage 175 to become a path for transferring data among the respective components.

In addition, the storage 175 may store an API, library, or resource file required for executing the computer program. Further, the storage 175 may store computer program data 180b in which the key management method is implemented.

In more detail, the storage 175 may store a computer program including an instruction to encrypt the service key used by the instance of the first user of the cloud service with the master key, an instruction to generate two or more key pieces for reconstructing the master key, an instruction to distribute and store the key pieces in two or more host servers included in the host group for providing the cloud service, an instruction to receive the request for the service key from the instance of the first user, an instruction to receive the key pieces from two or more host servers through the network interface and reconstruct the maser key based on the received key pieces, and an instruction to decrypt the encrypted service key by using the master key.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A key management method, comprising:
    encrypting a service key used by an instance of a first user of a cloud service, by using a master key;
    generating, with a key access server, two or more key pieces for reconstructing the master key;
    distributing, by the key access server, the two or more key pieces to two or more host servers included in a host group for providing the cloud service via a key sharing protocol, and storing each key piece in a different host server;
    receiving a request for the service key from the instance of the first user;
    receiving, at the key access server, the two or more key pieces from the two or more host servers and reconstructing, by the key access server, the master key based on the received two or more key pieces; and
    decrypting the encrypted service key by using the reconstructed master key, wherein the key sharing protocol is a protocol which permits data communication between the key access server and the two or more host servers and does not permit data communication between the two or more host servers, and
    wherein the two or more host servers determine whether the key access server is a malicious server by verifying key pieces opened by the key access server.

2. The key management method of claim 1, wherein the generating of the two or more key pieces comprises generating a number of the two or more key pieces that is more than or equal to a threshold number of key pieces required for reconstructing the master key.

3. The key management method of claim 2, wherein:
    the generating of the two or more key pieces comprises:
        generating a polynomial expression of a kth degree, the integer k being the same value as the threshold number of two or more key pieces required for reconstructing the master key, the polynomial expression having the master key as a coefficient of a 0-th degree term of the polynomial expression, and
        generating the two or more key pieces based on a function value of the polynomial expression.

4. The key management method of claim 3, wherein the generating of the two or more key pieces based on the function value comprises generating the two or more key pieces based on a remainder acquired by dividing the function value by a maximum size which the master key is able to have.

5. The key management method of claim 1, wherein:
    the distributing and storing of the two or more key pieces comprises receiving hash values from the two or more host servers in which the two or more key pieces are stored, and
    comparing the received hash values and hash values of the two or more key pieces transmitted to the host server.

6. The key management method of claim 1, wherein:
    the distributing and storing of the two or more key pieces comprises encrypting the two or more key pieces by using encryption keys of the two or more host servers, the encryption keys being different for each of the two or more host servers, respectively, and
    transmitting the encrypted two or more key pieces to the two or more host servers.

7. The key management method of claim 1, wherein the distributing and storing of the two or more key pieces comprises, distributing and the storing the two or more key pieces in host servers not associated with the cloud service provided to the first user among the two or more host servers included in the host group.

8. The key management method of claim 1, wherein the reconstructing of the master key comprises, transmitting key piece request messages to the two or more host servers which are more than or equal to a threshold number of two or more key pieces required for reconstructing the master key among the two or more host servers in which the two or more key pieces are distributed and stored.

9. The key management method of claim 1, wherein:
    the reconstructing of the master key comprises, encrypting the two or more key pieces by using the encryption keys of the two or more host servers, the encryption keys being different for each of the two or more host servers, respectively, and
    transmitting the encrypted key piece request messages to the two or more host servers.

10. The key management method of claim 1, wherein the reconstructing of the master key comprises storing the reconstructed master key in a memory based database.

11. The key management method of claim 1, wherein the reconstructing of the master key comprises determining whether the master key is present in a memory based database and thereafter,
    reconstructing the master key when the master key is not present in the memory based database.

12. The key management method of claim 1, wherein the master key is to have different values for each user of the cloud service.

13. A key management system, comprising:
    a key access server configured to:
        encrypt a service key used by an instance of a first user of a cloud service, by using a master key;
        generate two or more key pieces for reconstructing the master key;
        distribute the two or more key pieces to two or more host servers via a key sharing protocol, and store each key piece in a different host server; and
        decrypt the encrypted service key by reconstructing the master key based on the distributed and stored two or more key pieces when receiving a request for the service key from the instance of the first user,
    wherein the key sharing protocol is a protocol which permits data communication between the key access server and the two or more host servers and does not permit data communication between the two or more host servers, and
    wherein the two or more host servers configured to receive and store the two or more key pieces from the key access server and transmit the two or more key pieces when receiving a request for the two more key pieces from the key access server, and
    wherein the two or more host servers determine whether the key access server is a malicious server by verifying key pieces opened by the key access server.

14. The key management system of claim 13, further comprising:

a memory based database configured to receive and store the reconstructed master key from the key access server and transmit the master key when receiving a request for the master key from the key access server.

15. A non-transitory computer-readable medium for storing instructions to cause a computer to perform steps of:
- encrypting a service key used by an instance of a first user of a cloud service, by using a master key;
- generating, with a key access server, two or more key pieces for reconstructing the master key;
- distributing, by the key access server, the two or more key pieces to two or more host servers included in a host group for providing the cloud service via a key sharing protocol, and storing each key piece in a different host server;
- receiving a request for the service key from the instance of the first user;
- receiving, at the key access server, the two or more key pieces from the two or more host servers and reconstructing, by the key access server, the master key based on the received two or more key pieces; and
- decrypting the encrypted service key by using the reconstructed master key, wherein the key sharing protocol is a protocol which permits data communication between the key access server and the two or more host servers and does not permit data communication between the two or more host servers, and
- wherein the two or more host servers determine whether the key access server is a malicious server by verifying key pieces opened by the key access server.

* * * * *